(No Model.)
H. E. HARRINGTON.
WATER HEATER.
No. 393,900.  Patented Dec. 4, 1888.
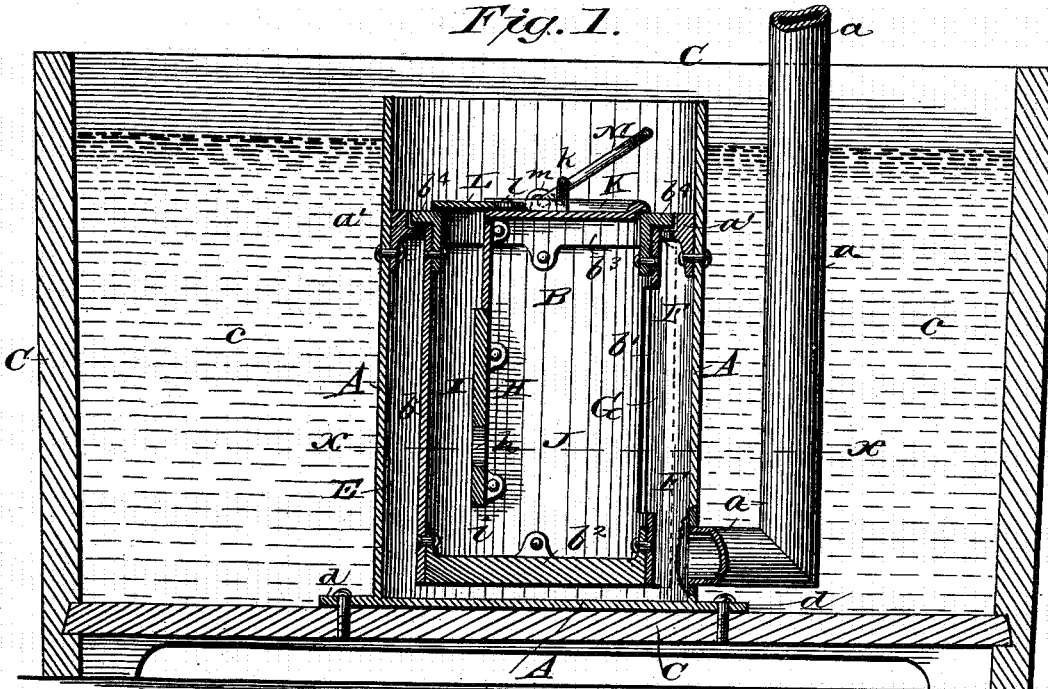
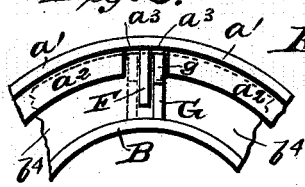
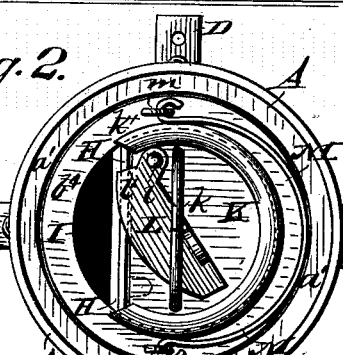
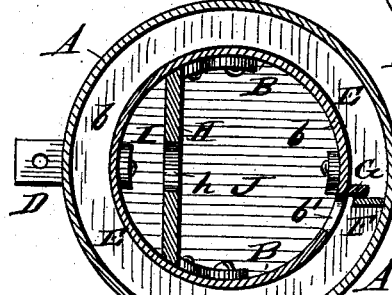
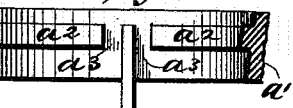
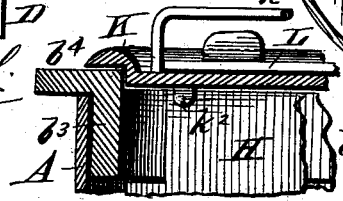
WITNESSES
Phil C. Dieterich
C. Sedgwick
INVENTOR:
H. E. Harrington
BY Munn & Co
ATTORNEYS.

UNITED STATES PATENT OFFICE.

HERBERT EUGENE HARRINGTON, OF WALDEN, VERMONT.

WATER-HEATER.

SPECIFICATION forming part of Letters Patent No. 393,900, dated December 4, 1888.

Application filed April 5, 1888. Serial No. 269,650. (No model.)

*To all whom it may concern:*

Be it known that I, HERBERT EUGENE HARRINGTON, of Walden, in the county of Caledonia and State of Vermont, have invented a new and Improved Water-Heater, of which the following is a full, clear, and exact description.

My invention relates to a heater to be set into a trough or tank holding water for heating the water to any required degree, as drink for stock, or for tempering milk or cream, or for other purposes about a farm or house; and the invention has for its object to provide a simple, inexpensive, durable, and efficient heater of this character.

The invention consists in certain novel features of construction and combinations of parts of the heater, all as hereinafter described and claimed.

Reference is to be had to the accompanying drawings, forming a part of this specification, in which similar letters of reference indicate corresponding parts in all the figures.

Figure 1 is a vertical sectional elevation of my improved water-heater set in a trough or tank of water as in use. Fig. 2 is a plan view of the heater removed from the trough, the draft-pipe being in horizontal section. Fig. 3 is a plan view of the heater in horizontal section on the line $x\ x$, Fig. 1. Fig. 4 is a like view with the fire-box set in another position and with a grate indicated in dotted lines. Fig. 5 is a detail vertical sectional view illustrating the stop-lug or device on the fire-box cover, and Figs. 6, 7, and 8 are detail views illustrating the stop or lug-latch devices holding the fire-box in position for a circuitous draft therefrom to the flue of the outer shell.

The heater consists, mainly, of an outer shell or wall, A, of sheet metal, preferably galvanized iron, and provided with a draft or smoke flue, $a$, and containing a somewhat smaller vessel, B, which is the fire box or pot of the heater. When the heater is in use, it will be placed in a trough or tank, C, holding water $c$, and the outer shell, A, will preferably be fastened to the bottom of the trough by screws or bolts $d$, passed through lugs D, fixed to the shell. The smoke or draft flue $a$ connects with the heater-shell A, preferably near the bottom of the shell, to give its heat to the water, and extends above the top of the trough C, where it will receive an ordinary stove-pipe, to get ample draft from the casing. The casing extends quite to the top of the trough, so that the water $c$ therein cannot enter the casing, all as shown most clearly in Fig. 1 of the drawings.

The details of construction are as follows: The fire-box B is made with a sheet-metal body portion, $b$, having a vertically-ranging slot, $b'$, or it may be a vertical series of holes instead of the slot. The bottom of the fire-box consists of a cast-metal plate, $b^2$, held to the body by screws or bolts, and at the upper end of the body is fastened by screws or bolts a cast-metal ring, $b^3$, having a lateral flange, $b^4$, by or from which the entire fire-box is supported from a horizontal flange, $a^2$, on a cast-metal collar or flange, $a'$, screwed or bolted to the inside of the shell or casing A and so as to hold the fire-box centrally in the shell and leave a clear space, E, of about an inch or a little more all around between the sides of the shell and fire-box and hold the box-bottom clear of the bottom of the shell, thus providing an air-space all around the sides and bottom of the fire-box within the shell. The shell is provided at the inside with a radial or nearly radial and vertically-ranging narrow-plate, F, which stands at one side of the opening of the flue $a$ to the shell and against or to which a vertically-ranging plate, G, fixed to the outside of the fire-box, may be brought, by turning the box, to regulate the draft-circuit through the heater. At its upper end the plate G is provided with a radially-projecting lug, $g$, which may be set into either of two notches, $a^3\ a^3$, which are formed by cutting out the fire-box, supporting flange $a^2$ at each side of the partition, F, which extends to the top of the collar-flange. The arrangement of the plate G and its locking-lug $g$, with the fire-box ring $b^4$, is most clearly shown in the perspective view, Fig. 8. The arrangement of the plate F, with the collar $a'$ and its flange $a^2$, and notches $a^3\ a^3$ is most clearly shown in the inside face view, Fig. 7, and the engagement of the lug $g$ of the plate G with the notches $a^3$ is shown most clearly in the under side view, Fig. 6 of the drawings.

In the fire-box, at one side of its center and opposite the slot $b'$, is fitted a vertical plate or partition, H, which may be made of cast metal.

at its lower part and of sheet metal at its upper part, and does not extend to the bottom of the fire-box, and thereby provides in the box an air-inlet flue, I, and the main fuel-holding chamber J, which communicate with each other through a passage, $i$, left below the partition H, and a hole, $h$, made in the partition above said passage.

The cover of the fire-box is made in two parts—a main part, K, which fits the top of the fuel-chamber J, and a smaller segmental portion, L, which forms the lid of the air-flue I, and is hinged at $l$ to the part K of the cover, and has a shoulder, $l'$, which strikes a shoulder, $k'$, on the part K when the air-flue is closed by the lid. The cover has a handle, $k$, fixed to its part K, and by which it may be lifted from the fire-box, and the part K of the cover also has a lug, $k^2$, at its under side, which may be set against the top of the partition H as a stop to set the cover by, so that its part L shall properly close the air-flue I of the heater. A suitable bail, M, held to eyes or staples $m$ in the upper metal ring or flange, $b^4$, of the heater fire-box, allows the box to be readily lifted from or applied to the shell A, and also serves as a handle by which to turn the fire-box to adjust its plate G relatively with the shell-plate F to regulate the draft.

The operation of the heater is as follows: Water having been supplied to the trough C up to a proper level, and the chamber J of the fire-box being charged with fuel and the cover K applied, the fuel will be ignited and the draft damper or lid L will be adjusted, preferably, by first fully opening it, and the fire-box will be lifted to disengage the lug $g$ of plate G from the notch $a^3$ of the casing-collar $a'$ with which it may have been engaged, and the fire-box may then be turned so that the plates F G on the shell and box will stand one at each side of the opening to the draft-flue $a$, which will give a direct draft from the fuel-chamber J through its slot $b'$ to the draft-flue $a$ while the fire is kindling to more readily pass off the smoke, and when the fire is well kindled the fire-box will be turned so that its plate G strikes the shell-plate F, as in Fig. 3 of the drawings, and the lug $g$ of plate G will then fall into one of the notches $a^3$ to lock the plates together, and thus cut off the direct draft and compel the entire products of combustion from the fuel-chamber J to pass therefrom through the slot $b'$ into the passage E between the shell and fire-box and make an entire circuit of said passage before finding exit at the draft-flue $a$. If desired, the fire-box may be turned but half-way around, as shown in Fig. 4, in which position the plate-lug $g$ may enter another notch formed in the casing-collar $a'$, as indicated in dotted lines in said figure, and so that the products of combustion may pass each way to the flue from the fire-box slot $b'$, the effect in either case being to carry the hot products from the fuel-chamber against the entire inner wall of the shell A, which radiates the heat to the water $c$ in the trough and warms or heats it to any required degree to serve as drinking water for stock or for other purposes about a farm or house. The air-draft to support combustion is downward through the air-flue I, and thence through the passages $i$ $h$ below and in the partition H to the fuel-chamber. The indraft of air at $i$ to the fuel-chamber at the bottom maintains the fire until the fuel is entirely consumed, and the indraft of air to the chamber through the hole $h$ prevents too rapid vertical spread of the fire in the chamber, and assures burning of the fuel laterally around the chamber or fire-box to maintain a more even heating of the entire wall of the fire-box, and consequently of the outer shell or casing, A, to secure its best heating effect on the water in the trough. Should coal be used as fuel, a grate will be fitted at the bottom of the fire-box, as indicated in dotted lines in Fig. 4 of the drawings.

The entire fire-box may at any time be lifted from the heater shell or casing for regulating the temperature of the water in the trough or for recharging the fuel-chamber at a place distant from the trough, as will readily be understood.

Having thus described my invention, what I claim as new, and desire to secure by Letters Patent, is—

1. The combination, in a water-heater, of an outer shell, a draft-flue opening into the side of the shell and extending upward clear of it to give off its heat independently, a fire-box supported in the shell, and with its side walls separate therefrom to provide a hot-air space ranging entirely around between the box and shell, and with which space the draft-flue communicates, and said fire-box having a fuel-chamber communicating with the space between the box and shell, and also having a downwardly-extending air-flue leading to its fuel-chamber, and a cover formed in two parts, one adapted to cover the fuel-chamber and the other adapted to cover the fire-box air-flue and form a damper thereto, substantially as herein set forth.

2. The combination, in a water-heater, of an outer shell or casing, a draft-flue fitted thereto, a fire-box supported in the shell so as to provide an air-space between the box and shell, and said fire-box having a fuel-chamber communicating by a side opening with the shell, and also having a downwardly-extending air-flue leading to the fuel-chamber, and a radial plate or plates fitted in the air-space between the shell and fire-box and providing, by turning the box, for either a direct or circuitous draft from the fuel-chamber of the box to the casing draft-flue, substantially as herein set forth.

3. The combination, in a water-heater, with an outer shell or casing, a draft-flue fitted thereto, a fire-box supported in the shell so as to provide an air-space between the box and shell, and said fire-box having a fuel-chamber communicating by a side opening with the shell, and also having a downwardly-extending air-flue leading to the fuel-chamber, and a radial plate fitted in the air-space between the shell and fire-box and providing, by turning the box, for either a direct or circuitous draft from the fuel-chamber of the box to the casing draft-flue, of a stop-lug and notches locking the cut-off plate or plates to assure an indirect draft, substantially as herein set forth.

4. The combination, in a water-heater, of a shell, A, having a draft-flue, $a$, and plate F, and a ring or flange, $a'$, a fire-box supported by a flange on the flange $a$ and providing a space, E, between the box and shell and having a side opening, $b'$, to said space, and said draft-flue communicating with the lower part of the shell and extending upward clear of it to give off its heat independently, a plate, G, on the fire-box, adapted to the shell-plate F, and said box also provided with a partition, H, forming in the box a fuel-chamber, J, and air-supply flue I and providing a lower draft-opening, $i$, substantially as herein set forth.

5. The combination, with a casing having a draft-flue and a fire-box supported therein and providing an air-space, E, of plates F G, held to the casing and fire-box, respectively, and the fire-box support in the casing, provided with notches $a^3$, and the plate G, having a lug, $g$, adapted to said notches, substantially as herein set forth.

HERBERT EUGENE HARRINGTON.

Witnesses:
  MILO O. CHANDLER,
  MARY F. HARRINGTON.